US008833654B1

(12) United States Patent
Grant

(10) Patent No.: US 8,833,654 B1
(45) Date of Patent: Sep. 16, 2014

(54) METHODS FOR ASSIGNING TRACEABILITY INFORMATION TO AND RETRIEVING TRACEABILITY INFORMATION FROM A STORE SHELF

(71) Applicant: YottaMark, Inc., Palo Alto, CA (US)

(72) Inventor: Elliott Grant, Woodside, CA (US)

(73) Assignee: YottaMark, Inc., Redwood City, CA (US)

( * ) Notice: Subject to any disclaimer, the term of this patent is extended or adjusted under 35 U.S.C. 154(b) by 111 days.

(21) Appl. No.: 13/736,521

(22) Filed: Jan. 8, 2013

Related U.S. Application Data

(63) Continuation-in-part of application No. 13/471,181, filed on May 14, 2012, now Pat. No. 8,474,714, which is a continuation of application No. 13/034,208, filed on Feb. 24, 2011, now Pat. No. 8,210,430.

(51) Int. Cl.
*G06K 15/00* (2006.01)
*G06Q 30/00* (2012.01)
*G06K 19/06* (2006.01)

(52) U.S. Cl.
CPC .... *G06K 19/06009* (2013.01); *G06K 19/06037* (2013.01)
USPC .......................................... 235/383; 235/385

(58) Field of Classification Search
USPC ................................................. 235/383, 385
See application file for complete search history.

(56) References Cited

U.S. PATENT DOCUMENTS

| | | | |
|---|---|---|---|
| 4,191,376 A | 3/1980 | Goldman et al. | |
| 4,650,218 A | 3/1987 | Hawke | |
| 4,791,565 A | 12/1988 | Dunham et al. | |
| 5,198,644 A | 3/1993 | Pfeiffer et al. | |
| 5,962,834 A | 10/1999 | Markman | |
| 6,269,342 B1 * | 7/2001 | Brick et al. | 705/20 |
| 6,305,942 B1 | 10/2001 | Block et al. | |
| 7,152,040 B1 * | 12/2006 | Hawthorne et al. | 705/16 |
| 7,584,882 B2 * | 9/2009 | Gray et al. | 235/375 |

(Continued)

FOREIGN PATENT DOCUMENTS

| | | |
|---|---|---|
| EP | 2175409 A2 | 4/2010 |
| WO | 2004075098 A1 | 9/2004 |

OTHER PUBLICATIONS

Yoshinori Takagi, "Personal Certification and Identification—Finger Print DNA," Monthly Electronics Magazine, vol. 43 (2), pp. 55-57, (1998).

(Continued)

*Primary Examiner* — Daniel Hess
(74) *Attorney, Agent, or Firm* — Peters Verny, LLP

(57) ABSTRACT

A shelf code in a machine readable format, such as on a QR code on a printed card, is provided where bulk merchandise displayed in a bin. When the bin is stocked from a case bearing a case code, the case code is associated with the shelf code. Lot-specific and lot-independent information previously associated with the case code is then linked to the shelf code. Consumers scan the shelf code with a mobile device to establish a communication channel to access the linked information. Retailers and producers use the channel to reach the consumer, and to solicit feedback from the consumer at a known time and location. A mobile device can also be used to associate quality assessments of merchandise to the shelf code. Analysis of consumer ratings and quality inspection assessments that are tied to time and location can provide valuable insights to both producers and retailers.

11 Claims, 8 Drawing Sheets

(56) References Cited

U.S. PATENT DOCUMENTS

| | | | |
|---|---|---|---|
| 7,680,691 | B2 | 3/2010 | Kimball et al. |
| 7,810,726 | B2 * | 10/2010 | de la Huerga ............... 235/385 |
| 8,284,988 | B2 | 10/2012 | Sones et al. |
| 8,496,173 | B2 | 7/2013 | Anselment et al. |
| 2001/0054005 | A1 * | 12/2001 | Hook et al. .................. 705/20 |
| 2003/0165799 | A1 | 9/2003 | Bisogno |
| 2003/0171944 | A1 | 9/2003 | Fine et al. |
| 2005/0075900 | A1 | 4/2005 | Arguimbau, III |
| 2005/0113649 | A1 | 5/2005 | Bergantino |
| 2005/0206586 | A1 * | 9/2005 | Capurso et al. ............... 345/50 |
| 2006/0022059 | A1 | 2/2006 | Juds |
| 2006/0074716 | A1 | 4/2006 | Tilles et al. |
| 2006/0169775 | A1 * | 8/2006 | Gray et al. .................... 235/385 |
| 2006/0199155 | A1 | 9/2006 | Mosher |
| 2006/0201432 | A1 | 9/2006 | Pratt |
| 2006/0260495 | A1 | 11/2006 | Siedlaczek |
| 2007/0118357 | A1 | 5/2007 | Kasravi et al. |
| 2008/0023472 | A1 | 1/2008 | Brandt |
| 2008/0083825 | A1 | 4/2008 | Yang et al. |
| 2009/0006127 | A1 | 1/2009 | Bahar |
| 2009/0065568 | A1 | 3/2009 | Grant et al. |
| 2009/0164466 | A1 | 6/2009 | Badyal |
| 2009/0275002 | A1 | 11/2009 | Hoggle |
| 2010/0112680 | A1 | 5/2010 | Brockwell et al. |
| 2010/0124359 | A1 | 5/2010 | Vaidya |
| 2010/0292998 | A1 | 11/2010 | Bodlaender et al. |
| 2011/0035326 | A1 | 2/2011 | Stoll et al. |
| 2011/0098026 | A1 | 4/2011 | Uland |
| 2012/0037697 | A1 * | 2/2012 | Boone et al. ............... 235/375 |
| 2012/0084119 | A1 | 4/2012 | Vandehey et al. |

OTHER PUBLICATIONS

YottaMark, Inc., YottaMark Launches HarvestMark for Cases, Aug. 2008, Gastoenterology Week, 676, http://search.proquest.com/docview/237361750?accountid=14753.

Grant, E., "Traceability: Giving every product an authentic identity" Jun. 2008, PackagePrinting, vol. 55, Iss. 6, pp. 30-33.

* cited by examiner

METHODS FOR ASSIGNING TRACEABILITY INFORMATION TO AND RETRIEVING TRACEABILITY INFORMATION FROM A STORE SHELF

CROSS-REFERENCE TO RELATED APPLICATIONS

This application is a Continuation-in-Part of U.S. Non-Provisional patent application Ser. No. 13/471,181 filed on May 14, 2012 which is a Continuation of U.S. Non-Provisional patent application Ser. No. 13/034,208 filed on Feb. 24, 2011, now U.S. Pat. No. 8,210,430, both entitled "Methods for Assigning Traceability Information to and Retrieving Traceability Information from a Store Shelf" and both incorporated herein by reference.

BACKGROUND OF THE INVENTION

1. Field of the Invention

The present invention relates to the field of traceability of consumer goods and more particularly to extending traceability to bulk merchandise through the use of a code displayed in conjunction with the bulk merchandise.

2. Description of the Prior Art

Bulk merchandise, such as certain fresh produce, can be difficult to trace back to a source once a retailer has set it out for sale. Shipping containers can carry traceability labels, but these labels are often destroyed once the bulk merchandise is removed and set out for sale. While some bulk merchandise may be large enough to accommodate a label, such as watermelons, it is either not practical or, producers have been unwilling to employ labels big enough to include traceability information. Rather, these labels are typically limited to a product lookup (PLU) code, country of origin, and a GTIN (Global Trade Item Number, a product identifier standard established by GS1) which do not provide item or lot-level traceability. Factors weighing against the adoption of larger labels to provide lot-level traceability include the expense and the visual impact. For other bulk merchandise any labeling is impractical or impossible. In some instances, such as with garlic or potatoes, adhesive labels will not adhere well. In other instances, such as with bulk grains and nuts, or bulk shrimp, the individual units are too small to label.

SUMMARY

The present invention provides methods of associating codes at the retail shelf (hereafter, shelf codes) to bulk merchandise so that the shelf code can be used by consumers, store associates, or in-store inspectors to access information about the bulk merchandise. In an exemplary method a shelf label including a shelf code is provided in proximity to a bin for bulk merchandise. The bin is stocked with bulk merchandise from a case, where the case bears a case label including a case traceability code. Additionally, the shelf code is dynamically associated to the case code, for example, by reading the case code and the shelf code with a mobile scanning device configured to make the association. In various embodiments the method further comprises associating additional information with the shelf code which in some embodiments includes querying a database using at least some of the case code. In some embodiments, the exemplary method further comprises associating the shelf code with the bin, for instance by scanning the shelf code and a bin identification located on or near the bin.

In various embodiments, providing the shelf label includes printing the shelf label on demand, including the shelf code. In other embodiments, providing the shelf label includes receiving a pre-printed label including the shelf code and optionally further printing upon the pre-printed label. In still other embodiments, providing the shelf label includes receiving a pre-printed sticker including the shelf code, printing a label, and adhering the sticker to the label.

In various embodiments the exemplary method further comprises providing an alert to the retailer. The alert can be displayed on a mobile scanning device to indicate a potential stocking error or recall, for instance. In various embodiments the exemplary method can also further comprise displaying information proximate to the bin, such as on a display. Such information can include lot-, item-, or brand-specific information about the bulk merchandise. The display can also invite consumers to scan the shelf code with a smart phone to access further information, coupons, promotions, recipes, and so forth.

In various embodiments the exemplary method further comprises rating the appearance, condition, merchandizing location, and other quality related attributes of the bulk merchandise in the bin and associating the rating data to the shelf code, which can thus be associated with the case(s) of product that were displayed at the location(s) related to the shelf code. In further embodiments the method further comprises removing bulk merchandise from the bin. In these embodiments the method can further comprise associating the identity of the person performing the action, the time and date of the removal, and/or the amount of removed merchandise to the shelf code using the mobile scanning device. The mobile scanning device can also be used to associate quality attributes, through the use of codes for example, to the removal event to indicate the condition of the merchandise that was removed.

The present invention also provides shelf labels. An exemplary shelf label comprises a bar code comprising either a unique code that is translated into a URL, or a URL, where the URL includes a domain and an extension, and the extension specifies a shelf code. Such shelf labels can also comprise a call to action and/or information about bulk merchandise such as a country or origin and a price. In various embodiments, the bar code is a QR code and the QR code encodes the URL in the form of www.example.com/shelf_code.

The present invention also provides an item of manufacture consisting of, or consisting essentially of, a roll of stickers on a backing. Here, each sticker comprises a QR code, and each QR code encodes a different URL including the same domain but with a different extension, where each extension comprises a different shelf code. Stickers from the roll can be removed as needed and placed on labels to create shelf labels.

The present invention also provides mobile scanning devices for use in conjunction with shelf codes in retail environments. An exemplary mobile scanning device is a handheld device comprising a bar code reader, a touchscreen display, a communication interface, and logic. The logic can provide a number of modes of operations, for example, an association mode and a quality assurance mode. In the association mode the logic is configured to prompt a retailer to associate shelf codes with case codes. In this mode, after receiving a scanned shelf code from the bar code reader, the logic is configured to display on the touchscreen a prompt to scan a case code, then configured to receive a scanned case code, associate the scanned case code to the scanned shelf code, and communicate the shelf code in association with the case code through the communication interface.

In a quality assurance mode, the mobile scanning device can be used to collect information about the quality of merchandise. In this mode the logic can be configured to, responsive to reading a shelf code, display a grading scale on the touchscreen display, receive a selection from the grading scale, receive other relevant data about product condition, location, and appearance, and associate the selection(s) with the shelf code. Similarly, when stock is removed from the bin, the logic can also be configured to, responsive to reading a shelf code, display codes on the touchscreen display that can be associated with the removal event, where the codes represent possible conditions of the merchandise being removed. The logic can be further configured to allow the user to enter the quantity being removed. The logic then associates the quantity and/or the condition codes with the shelf code.

The present invention also provides methods for a third party to make lot-specific information available to consumers. An exemplary method comprises providing a plurality of shelf codes such as to a retailer. The method further comprises receiving, with a computing system, a first case code in association with lot-specific information such as from a producer of bulk merchandise. The method further comprises receiving a shelf code in association with the first case code, such as from a retailer, where the shelf code is one of the plurality of shelf codes, and creating a web site having a URL that includes the shelf code. In various embodiments, creating the web site includes populating a template with at least some of the lot-specific information. In various embodiments the method further comprises receiving the shelf code again from the retailer, but in association with a second case code. In these embodiments the method further comprises revising the web site having the URL including the shelf code. Here, revising the web site can comprise repopulating the template or populating a new template, for example.

In various embodiments the method further comprises serving the web site, signifying a trace event. Each trace event can comprise an exchange of information with a consumer and can include receiving a quality assessment and associating the quality assessment to the first case code. Other information that can be received from the consumer in a trace event includes demographic information. Each trace event can be time stamped and is linked to a known location since the shelf code is in a known location. The method can also comprise receiving quality assessments through other channels, such as from retailers. The method optionally further comprises analyzing accumulated information from consumers, retailers, and others to provide analytics to retailers and producers.

Still methods of the present invention employ shelf codes paired in advance with case codes. One such exemplary method comprises receiving a case of bulk merchandise where the case includes a case label having a case code and a secondary label having a machine-readable shelf code encoded, for example, as a QR code. The method further comprises stocking a bin with bulk merchandise from the case, removing the secondary label from the case, and affixing the removable label to the bin or a shelf, shelf-strip, or sign proximate to the bin. Optionally, the method can also include reading the case code from the case label with a mobile scanning device when the bin is stocked. In some of these embodiments the secondary label is disposed on the case label, and removing the secondary label from the case comprises removing the secondary label from the case label. In other embodiments the secondary label is disposed proximate to the case label rather than being disposed on the case label, but still designed to be removable from the case.

Another method of the invention that employ shelf codes paired in advance with case codes. This method can be performed by a producer of bulk merchandise such as a farmer, for instance. The exemplary method comprises creating a batch of paired labels, each pair of labels including a case label including a case code, and a shelf label including a machine-readable URL including a domain and an extension, the extension specifying a shelf code. The batch of paired labels can be created by a producer of bulk merchandise, for example. The method further comprises storing an association between the shelf code and the case code for each pair of the batch, associating lot-specific information to a case code from the batch, and creating a web site identified by the URL from at least one of the shelf labels. In some embodiments, the machine-readable URL is encoded by a QR code. In various embodiments the shelf label is disposed on the case label, and is removable therefrom. In various embodiments the case code of each pair of labels of the batch is unique, while in other embodiments the shelf code of each pair is unique, and in still other embodiments both the case code and the shelf code are unique. In some embodiments the method further comprises receiving a quality rating and associating the rating to the shelf code. For example, a requestor such as a consumer or an inspector can use a mobile device to read the URL and connect to the website; the requestor can then submit a quality rating for the merchandise, whether still in the case or displayed for sale, and the quality rating can be associated with shelf code.

The present invention also provides case labels. An exemplary case label comprises a primary label including a removable label. The removable label is configured to be removed from the primary label after the primary label has been adhered to a surface. In these embodiments the primary label includes a case code and information about bulk merchandise. The removable label includes a call to action and a bar code comprising a URL, such as a QR Code, where the URL includes a domain and an extension, and the extension specifies a shelf code. In some embodiments the removable label peels off of the primary label, while in other embodiments the removable label comprises a separable tab removable along a line of perforations. In various embodiments the removable label includes a low-tack and pressure-sensitive adhesive on a side opposite the bar code.

DETAILED DESCRIPTION OF THE INVENTION

Figure 1:
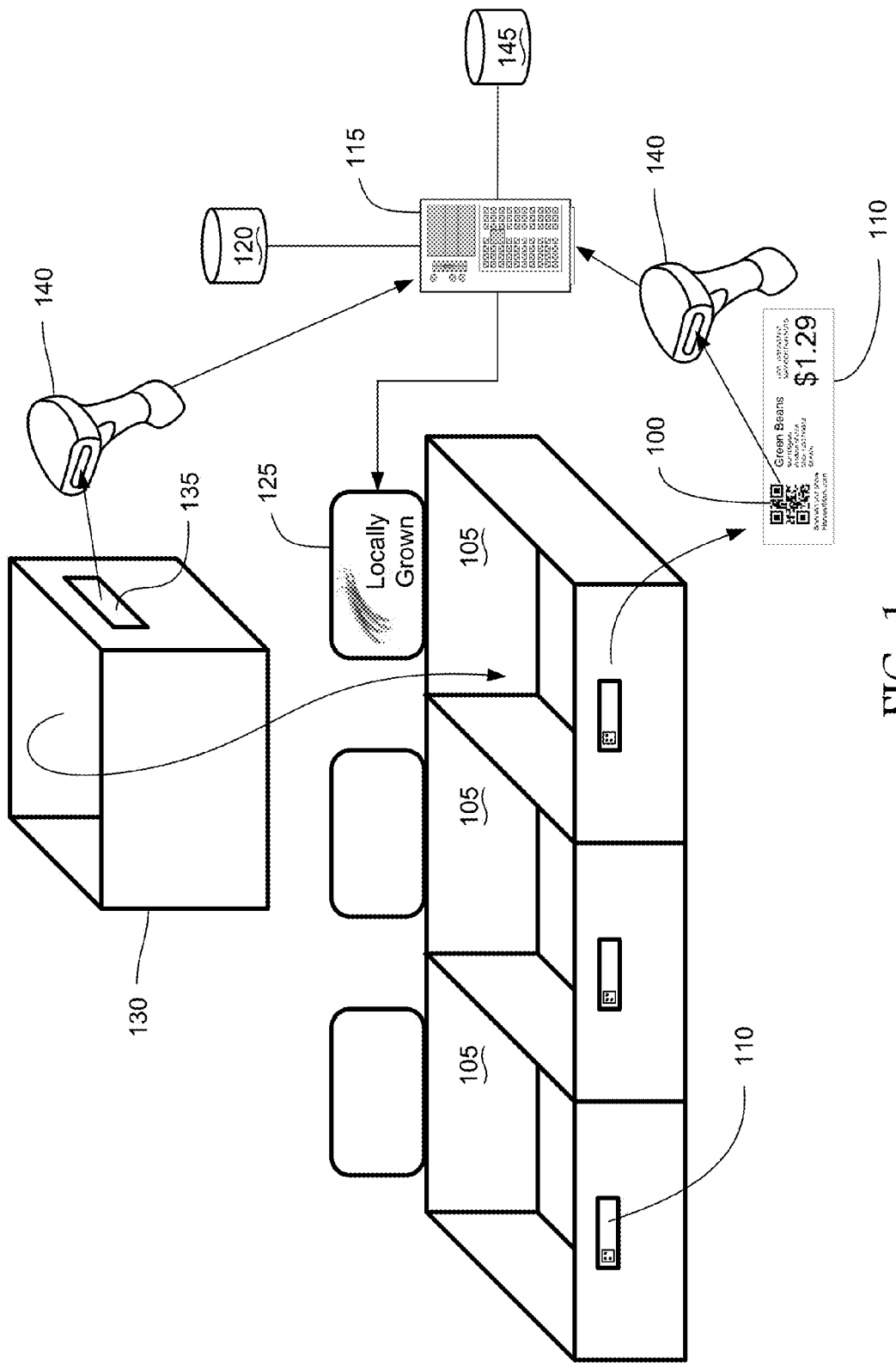
FIG. 1 schematically represents a retail operation according to an exemplary embodiment of the present invention.

The present invention is directed to the placement of shelf codes provided in a machine readable format, such as on a QR code, where bulk merchandise is displayed for sale in a bin. The shelf code becomes the nexus in a rich exchange of information between consumers, retailers, and the producers and packers of the bulk merchandise. A third party may provide systems and services to support the exchange of information between the parties. According to various embodiments of the present invention, producers pack bulk merchandise into cases bearing case codes and associate both lot-specific and lot-independent information to the case codes before the cases enter the supply chain, and optionally at key points in the supply chain. An exemplary example of a case code is a label that is compliant with the Produce Traceability Initiative—which contains both lot-specific information and lot-independent information such as the product description. Retailers then associate the case codes to shelf codes when stocking bins.

Consumers can access information linked to the case code by scanning the shelf code, such as with a camera of a mobile phone or other mobile device, to learn about where their food is coming from, for example. Typically, the mobile device accesses the information by connecting to a web site or web service and this connection creates a communication channel between the web site and the consumer. The communication channel allows both the retailer and the producer to reach the consumer through the web site in various ways including sharing product and harvest/packing attributes, targeted advertising, providing recipes, providing coupons, and the like. The communication channel also provides a way to collect feedback from the consumer that can be useful to either or both of the producer and retailer. Thus, survey answers can provide demographic information about the customer, and quality ratings of the bulk merchandise can demonstrate how bulk merchandise for a particular producer is perceived at a particular time and location.

In the same way that a consumer can scan the shelf code and connect to a web site from a smart phone or other mobile device, quality assurance inspectors and others can also utilize the shelf codes to establish communication channels. In some embodiments, a mobile scanning device is specially designed for use in retail operations for quality assurance and other purposes. With such a scanning device a user scans the shelf code and enters quality assessments. The data is either aggregated for a period of time and then uploaded, else the data is uploaded continuously as acquired. While a shelf code displayed in a QR code can direct consumers using smart phones to a specific web site, a specially configured scanning device can optionally read the shelf code and connect to other portals. In some embodiments, the same mobile scanning device can provide quality assurance functions and also make the associations between shelf codes and case codes. In some embodiments, the same mobile scanning device can record the time at which the produce is on the shelf, and therefore calculate the age of the product derived from the lot-specific information.

Information gathered in connection with a shelf code reading is inherently linked to the location where the shelf code is in use. The location can be entered when an association is made between a case code and a shelf code, or the logic on the scanning device can derive the location by using location services such as GPS. Such information can also be time stamped. With respect to quality assessments, producers acquire two sets of data linked to a common case code. One set of data associated with the case code is lot-specific information collected at the beginning of the supply chain, such as harvest conditions, type of seed, fertilizer applications, and so forth. The other is set of data associated with the case code shows where the merchandise went, when it was displayed for sale at the destination, how it was perceived at the destination at specific times, how much was ultimately removed from stock by the retailer, and for what reasons. Retailers can also derive valuable insights from collected data about their customers' demographics, the customers' experiences in their stores, product placement within their stores, which producers' merchandise is most highly rated, and so forth. Also, by making product information more easily accessible to consumers, retailers enhance the shopping experience for their customers.

Figure 2:
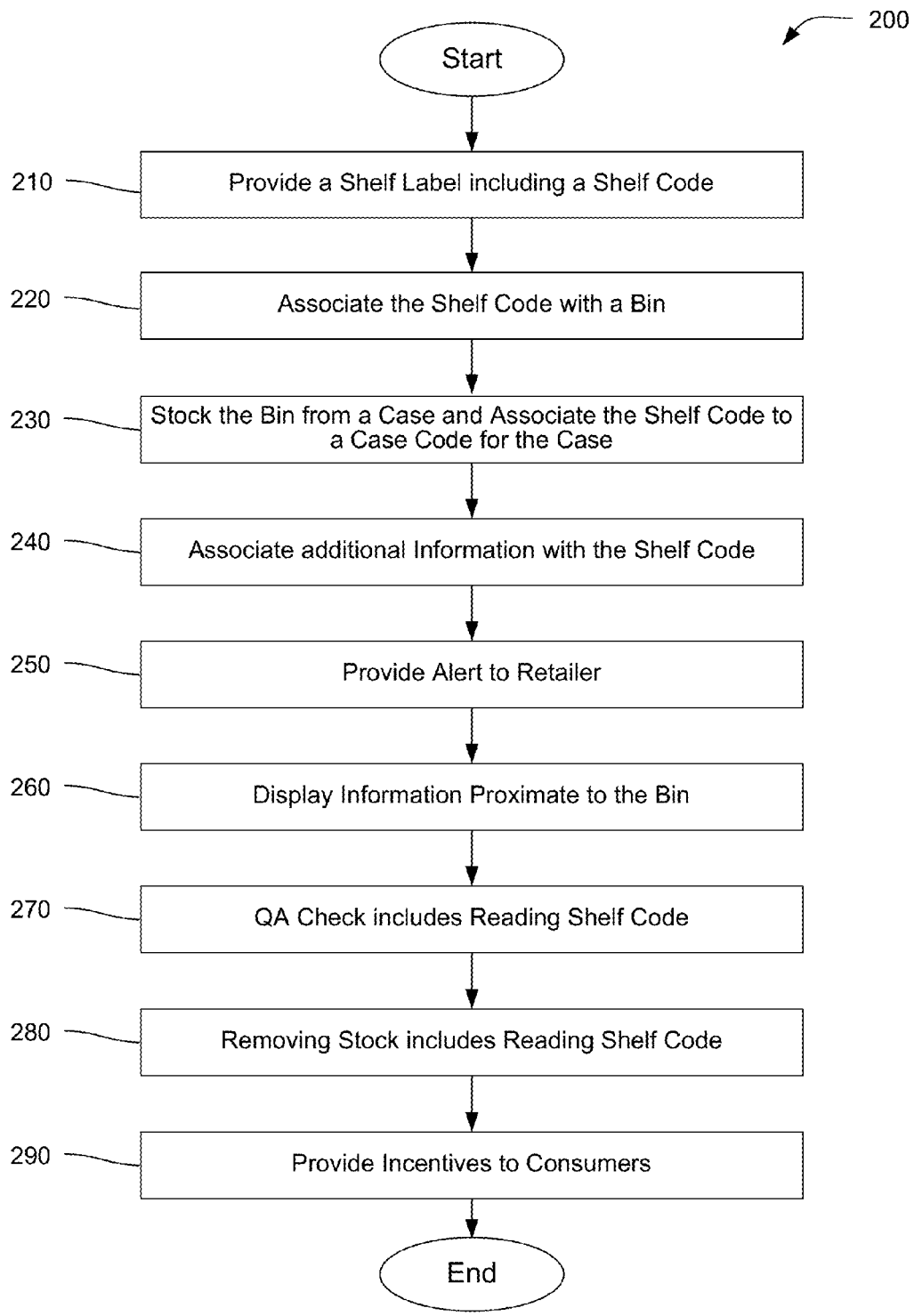
FIG. 2 is a flowchart representation of a method of associating shelf codes to bulk merchandise according to an exemplary embodiment of the present invention.

FIG. 1 schematically illustrates the operation of a retailer under the present invention, and FIG. 2 illustrates the steps of an exemplary method 200 in the form of a flow chart. The operation of the retailer, herein, refers to an integrated process of manual and electronic steps where the manual steps are performed within a retail setting such as within a grocery store. A retailer is used herein to refer to both the controlling entity such as a sole proprietor or a corporation, as well as to the individual that performs manual tasks such as stocking shelves, sometimes referred to as an associate. Electronic steps performed by a retailer, such as making associations between codes, may be performed by mobile devices and computing systems controlled by the retailer or by third-party computing systems in communication with the retailer.

Initially, in a step 210, the retailer provides a shelf code 100 for a bin 105. For example, the shelf code 100 can be provided on a shelf label 110. As used herein, a bin refers to a defined location for displaying bulk merchandise for sale. In various embodiments the bin 105 is identified by a serial number or code. In some of these embodiments the bin 105 is associated with the shelf code 100 by a computing system 115 and the association is stored in a database 120 in a step 220. This association is useful in some contexts, but not essential. For example, if a bin identifier for the bin 105 is associated with the shelf code 100, an electronic display 125 for the bin 105 can be updated as the contents of the bin 105 subsequently change. It will be appreciated that computing system 115 can be, for example, a personal computer (PC) or server located at a store or at a central location for a chain of stores. The computing system 115 can also be controlled by a third-party that hosts a plurality of retailers.

The shelf code 100 can be a serial number or secure serial number that is then assigned to a retail store brand. An exemplary shelf code 100 comprises 16 characters. The shelf code 100 is provided in a machine-readable format such as a bar code. A suitable bar code format for the shelf code 100 is the two-dimensional Quick Response (QR) code that can be read using the combination of camera and software available on many smart phones. In some embodiments, a QR code encodes both the shelf code 100 and a Uniform Resource Locator (URL). As discussed in greater detail below, when read by a properly configured smart phone, the URL can direct an application operating on the smart phone to connect to a web site.

The shelf label 110 can be provided in a variety of different ways. In some embodiments, the retailer prints shelf labels 110 as needed. Shelf labels 110 can comprise cardstock or adhesive-backed paper, for instance. An example of a retailer-printed shelf label 110 is illustrated by shelf label 300 in FIG. 3 and includes the shelf code 100 encoded in a QR code and optionally also includes a call to action 310 ("Scan with your phone"), and information about the bulk merchandise such as the price 320, and so forth. In some embodiments the retailer generates the shelf codes 100, while in other embodiments the retailer receives a batch of shelf codes 100 from a third-party supplier. The third party supplier of shelf codes could also provide shelf codes with the retailer's domain embedded. In some embodiments the QR code also encodes a URL in the form of www.example.com/shelf_code. Where the retailer generates the shelf codes 100, the domain name can be specific to the retailer such that a properly configured smart phone that scans the shelf label 110 will connect to a web site hosted by the retailer. In those embodiments in which the retailer obtains shelf codes 100 from a third-party, the domain name within the URL can be for a third-party web site that serves multiple retailers. Should a shelf label 110 become unreadable, or out-of-date, the retailer can rapidly replace the shelf label 110 with a new one bearing the same or a new shelf code 100 and associated data can be transferred to the new label.

Figure 3:
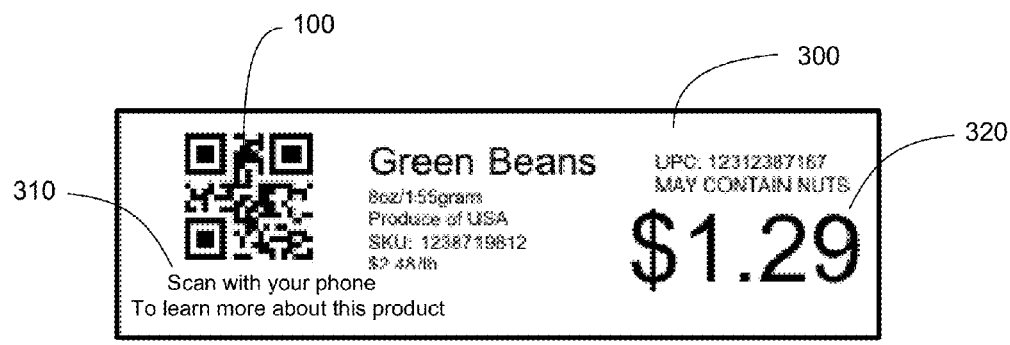
FIG. 3 illustrates a complete shelf label including a shelf code according to an exemplary embodiment of the present invention.
Figure 4:
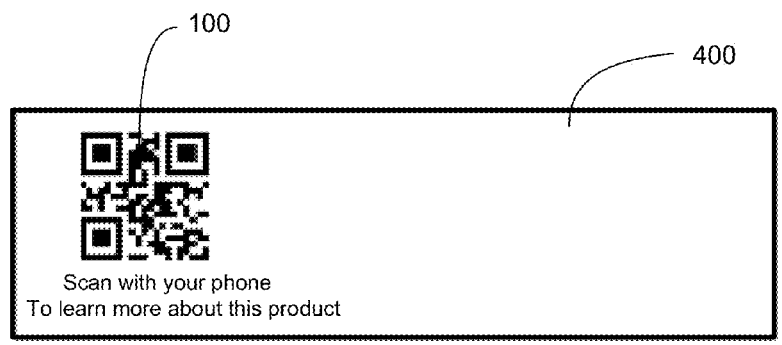
FIG. 4 illustrates a partially pre-printed shelf label including a shelf code according to an exemplary embodiment of the present invention.

In other embodiments, the retailer receives a pre-printed label from a third-party supplier that generates the shelf codes 100. An exemplary pre-printed label 400 is illustrated in FIG. 4. The pre-printed label 400 includes the shelf code 100 and optionally information that is not specific to any particular product, such as the call to action. A third-party supplier can provide a retailer with a large number of pre-printed labels 400, each with a different shelf code 100. Pre-printed labels 400 can be further printed upon, by the retailer, as needed to create labels 300 (FIG. 3). As above, in some embodiments each shelf code 100 is encoded in a QR code and each QR code further optionally encodes a URL with a domain for a web site hosted by the third-party.

Figure 5:
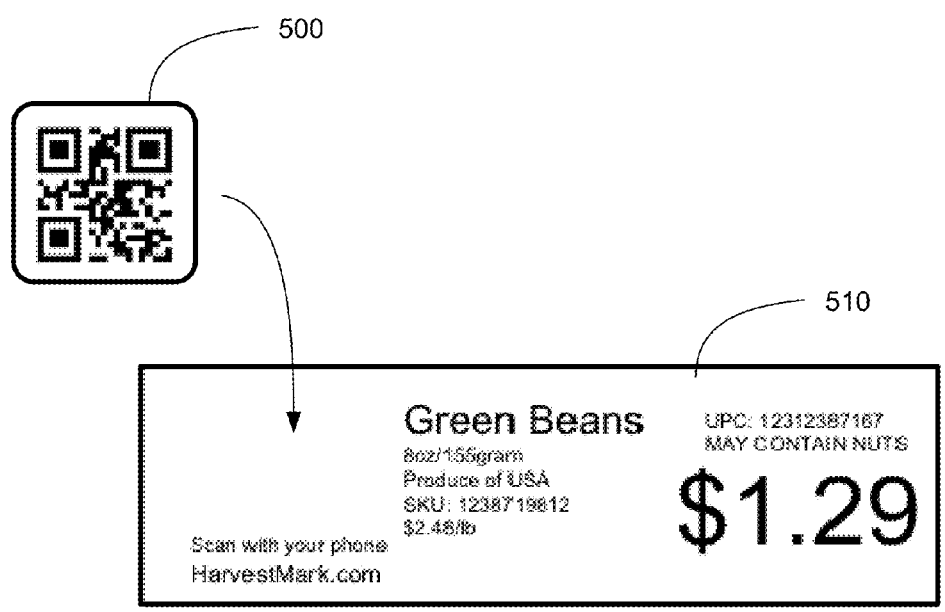
FIG. 5 illustrates placing a sticker including a shelf code onto a partially printed shelf label according to an exemplary embodiment of the present invention.

In still other embodiments the retailer receives a pre-printed label from a third-party supplier where the label is an adhesive-backed sticker 500 as shown in FIG. 5. Stickers 500 can be dispensed from a roll of stickers 500 on a backing as needed by the retailer. Stickers 500 can be placed directly on the bin 105, or can be placed upon a label 510 that is printed by the retailer as needed. A label 510, bearing a sticker 500, is equivalent to the label 300 and to the label 400 after further printing by the retailer.

Optionally, rather than printing or pre-printing shelf codes 100 on shelf labels 110, a shelf label 110 can comprise an electronic display that displays an image of the shelf code 100. Further still, a shelf code 100 can be encoded as a radio frequency tag (e.g. RFID or Near-field RF) used in addition to, or in place of, a printed or electronically displayed shelf code 100.

Next, in a step 230, the retailer receives bulk merchandise and stocks the bin 105 with the bulk merchandise. As used herein, bulk merchandise refers primarily to items that lack packaging having lot-level traceability information such as lot-specific codes. Bulk merchandise is described herein primarily with respect to food items, but it should be appreciated that bulk merchandise is not limited to food and can include other items sold analogously, such as nails, shampoo, OTC pharmaceuticals, small toys, and so forth. Bulk merchandise may include some packaging, such as the foam mesh sleeves used to protect pears, wrappers on individual pieces of candy, and the like, but such packaging lacks lot-level traceability information that can be used to trace such an item back through the supply chain. It will be understood that the system works equally well in delivering a shopper and an inspection experience for products that are packaged in materials such as bags and clamshells that do include lot-level traceability codes.

Bulk merchandise is received by the retailer in a case 130 that includes a case label 135. The case label 135, in turn, comprises a case code that includes a Stock-Keeping Unit (SKU) identifier, such as a GS1 GTIN (Global Trade Identification Number), and a lot number, or lot code. With respect to produce, the Produce Traceability Initiative (PTI) is an initiative designed to improve traceability through the entire supply chain from the source to the point of sale. Compliance with the Initiative requires that each case 130 carry a label 135 that includes a GTIN and a lot code. Accordingly, cases 130 of produce are commonly labeled at the source with a case label 135 that includes a case code that encompasses both lot-specific information (lot code) and lot-independent information (GTIN). In some embodiments the GTIN and lot code are provided using the GS1-128 barcode. Alternatively or additionally, case codes on case labels 135 may comprise a unique serial number that is linked to SKU and production information in a remote database. It will be appreciated that other forms of bulk merchandise, other than produce, can be similarly packed at the source into cases 130 provided with case labels 135 bearing case codes.

When stocking the bin 105 in step 230, the retailer associates the shelf code 100 to one or more case codes. The association can be made by scanning both the case code from the case label 135 and the shelf code 100 with a mobile scanning device 140, such as a hand-held bar code reader, where the mobile scanning device 140 includes logic configured to make the association. In instances where the contents of more than one case 130 are used to stock the bin 105, the retailer may scan the case code from the case label 135 of each, unless some case codes are duplicative. Thus, where more than one case 130 has the same case code, the case label 135 of only one case 130 need be read. Determining whether case codes on different cases 130 are the same or different can be simplified through the use of voice codes as described in U.S. patent application Ser. No. 12/689,949 filed on Jan. 19, 2010 and entitled "Voice Code with Primary and Secondary Digits" which is incorporated herein by reference.

In various embodiments the mobile scanning device 140 employs a laser to read bar codes, while in other embodiments the mobile scanning device 140 includes an optical camera and logic configured to capture an image of a bar code and process the image to interpret the bar code. The mobile scanning device, in some embodiments, is configured with a suitable RF reader for reading radio frequency tags.

In some embodiments, the mobile scanning device 140 includes logic configured to prompt the retailer to first read a shelf code 100, and then read the case codes from the case labels 135 of the cases 130 used to stock that bin 105. If there are different case labels (e.g. different brands, different packing configurations or different lot numbers) then either a representative label would be scanned or multiple different case labels may be associated with a single shelf code, indicating mixed product. The logic then associates the shelf code 100 with each case code scanned thereafter.

In various embodiments the logic of the mobile scanning device 140 is further configured to record a time stamp in association with the shelf code 100 representing the time the shelf code 100 was read. Similarly, in various embodiments the logic of the mobile scanning device 140 is further configured to determine a location of the mobile scanning device 140 at the time the shelf code 100 was read and associate that location with the shelf code 100, and optionally calculate the distance traveled from origin to store. Location information such as GPS or cellular triangulation coordinates can be later used to link the data to a particular retail store. Alternately, each mobile scanning device 140 can have a unique identification which is associated with the records created by associating shelf codes 100 with case codes. Mobile scanning devices 140 can also include logic configured to associate a shelf code 100 with a bin identification in step 220, and logic configured to perform other functions described below, such as assessing quality and removing outdated stock.

In some embodiments the mobile scanning device 140 includes a memory device and further includes logic configured to store shelf codes 100 in association with case codes to the memory device. At a subsequent time, accumulated shelf codes 100 and associated case codes and other data can be uploaded from the memory device of the mobile scanning device 140 to the computing system 115 to be stored in the database 120. Alternatively, the mobile scanning device 140 can include a wireless interface and the shelf code 100 and associated case codes and further data can be uploaded in real-time through a wireless connection. The database 120 optionally is hosted locally, hosted by a third-party, or hosted through a cloud computing application.

It will be appreciated that although the shelf code 100 is useful to extend traceability of bulk merchandise to beyond the case 130 itself, shelf codes 100 can also be used in conjunction with merchandise that is not bulk. For example, clamshells of strawberries can include labeling that is lot-specific, but the clamshells are still packed in cases 130 with case labels 135 bearing case codes. In step 230 the retailer can still associate the case code from the case label 135 with a shelf code 100 when stocking strawberries as described above, or by scanning the shelf code 100 and then scanning one of the traceability codes on one of the clamshells. Accordingly, although the invention is described primarily with respect to bulk merchandise, the invention is not limited in scope thereto.

In a step 240 additional information is associated with the shelf code 100, for example, by associating the additional information with the existing association between the shelf code 100 and the case code. The additional information can be stored in the database 120, or alternatively, the database 120 can store a pointer to a location where the information is located in a second database 145. In some embodiments, the computing system 115 queries the second database 145 using some or all of the case code to obtain the further information. The second database 145 can comprise a GS1 Data Pool, a database maintained by the producer or manufacturer, or a third party web service, for example.

Where the case code comprises a GTIN and lot code, either the GTIN alone, or both the GTIN and lot code can be used to query the second database 145 to obtain additional information. Where the bulk merchandise comprises produce, the GTIN in the second database 145 points to such lot-independent information as the grower/shipper name, product name, variety, growing method, country of origin, product size, and grade. Lot-specific information associated with the lot code can include harvest and/or packing date, ranch or farm name, crew number, temperature at time of harvest, and so forth. It will be appreciated that some information associated to a lot code may not be accessible to a query from the computing system 115. In those embodiments where the case code comprises a unique serial number, both lot-independent and lot-specific information could be available.

In an optional step 250, an alert can be provided to the retailer. For example, if the retailer attempts to associate two different case codes with a common shelf code 100, and the case codes are associated with different products (e.g., navel oranges and blood oranges), an appropriately configured mobile scanning device 140 can alert the retailer to the conflict. Here, the alert is generated by the mobile scanning device 140, but in other instances an alert can be generated by the computing device 115 and communicated to the retailer through the mobile scanning device 140. In these embodiments the computing device 115 and mobile scanning device 140 are configured to communicate wirelessly.

As an example of an alert situation, in a first instance of step 240 a first case code associated with a shelf code 100 for a bin 105 is further associated with a date (e.g., present date, harvest, or packing date), then, in a subsequent step 230 the bin 105 is again stocked and a second case code is scanned and associated with the shelf code 100. If, in the next instance of step 240 a more recent date becomes associated with the shelf code 100, the retailer can be prompted at that time to rotate the stock to bring the older bulk merchandise forward or to remove the older bulk merchandise. Here, the identification of a date change is performed by the computing device 115 and the alert is communicated to the mobile scanning device 140.

Similarly, the information associated with the shelf code in a step 240 could pertain to a product recall or withdrawal notice for the specific lot or lots associated with the case code read in the prior step 230. In such a situation the computing device 115, upon receiving the recall notice, can communicate an alert to the mobile scanning device 140 to the recall and to remove the affected bulk merchandise. In addition, an alert could later be sent to the retailer notifying the appropriate personnel that a recall notice was posted after the product was associated with a shelf code.

In an optional step 260, information obtained in step 240 can be displayed proximate to the bin 105, such as on the display 125. Such information can be lot-independent or lot-specific, or both. For example, if the bin 105 has been associated with the shelf code 100 in step 220, then in a later step 240 lot-independent information such as the type of produce, and lot-specific information such as the country of origin and/or the name and location of the farm from which it came, can be displayed. The information displayed proximate to a bin 105 can be automatically updated as often as the bin 105 is restocked. In one embodiment, the display 125 is operated by logic controlled by a third party and a message is sent to the third party logic each time a case code is associated with a shelf code 100. The third party logic can then determine when and where to best display the new information.

In an optional step 270 the retailer can perform QA checks that include reading the shelf code 100. For example, a mobile scanning device 140 configured for performing QA can read the shelf code 100, prompt the retailer to rate the quality of the produce in the bin 105, and then associate the rating to the shelf code 100. Since the shelf code 100 is associated to the case code, the rating becomes further associated with case code. Location and time can be further associated with the rating. Exemplary methods for linking quality assessments back to lot-specific product data are provided in U.S. patent application Ser. No. 12/908,667 filed on Oct. 20, 2010 and entitled "Methods for Correlating First Mile and Last Mile Product Data" which is incorporated herein by reference.

In an optional step 280 the retailer can remove stock from the bin 105, and in this step, the shelf code 100 is read by the mobile scanning device 140 and associated with the removal. In some embodiments of the mobile scanning device 140, the device is configured to make the association by associating the shelf code 100 with a time stamp and a flag signifying removal, for instance. Once communicated to the computing device 115, the computing device 115 associates the removal with the case code(s) most recently associated with the shelf code 100. Additionally, the mobile scanning device 140 is configured, in some embodiments, to prompt the retailer to enter further information to be associated with the removal. Such information can include the quantity removed, such as a number of pieces, and a problem code that signifies the reason for the removal, such as damaged product, mold, and product aged out.

In an optional step 290, the retailer can offer incentives to consumers based on information associated with the shelf code 100 from step 230 or 240. For example, in step 230 the shelf code 100 is associated with a case code and further associated with a time stamp. After a threshold period of time the computing system 115 can make a coupon available to consumers, where the coupon is good for a limited time. A consumer that scans the shelf code 100 with a smart phone could receive the coupon, as described further below. In some embodiments, the computing system 115 is configured to provide a message on the display 125 directed consumers to scan the shelf code 100 to receive a discount coupon.

In other embodiments, rather than triggering the incentive in step 290 based on an elapsed time in the bin 105, information associated with the shelf code 100 in step 240, such as harvest date provides a basis for determining when to offer an incentive to consumers. For example, the threshold period of time can be a set number of hours or days after harvest. Further, incentives are not limited to coupons, and can include usage suggestions, for example. Thus, after a threshold period of time the computing system 115 can display a message such as "Use These Apples as a Quick Dessert Tonight—Scan this Shelf Code to Learn How" and scanning the shelf code 100 would provide a recipe to the smartphone.

Figure 6:
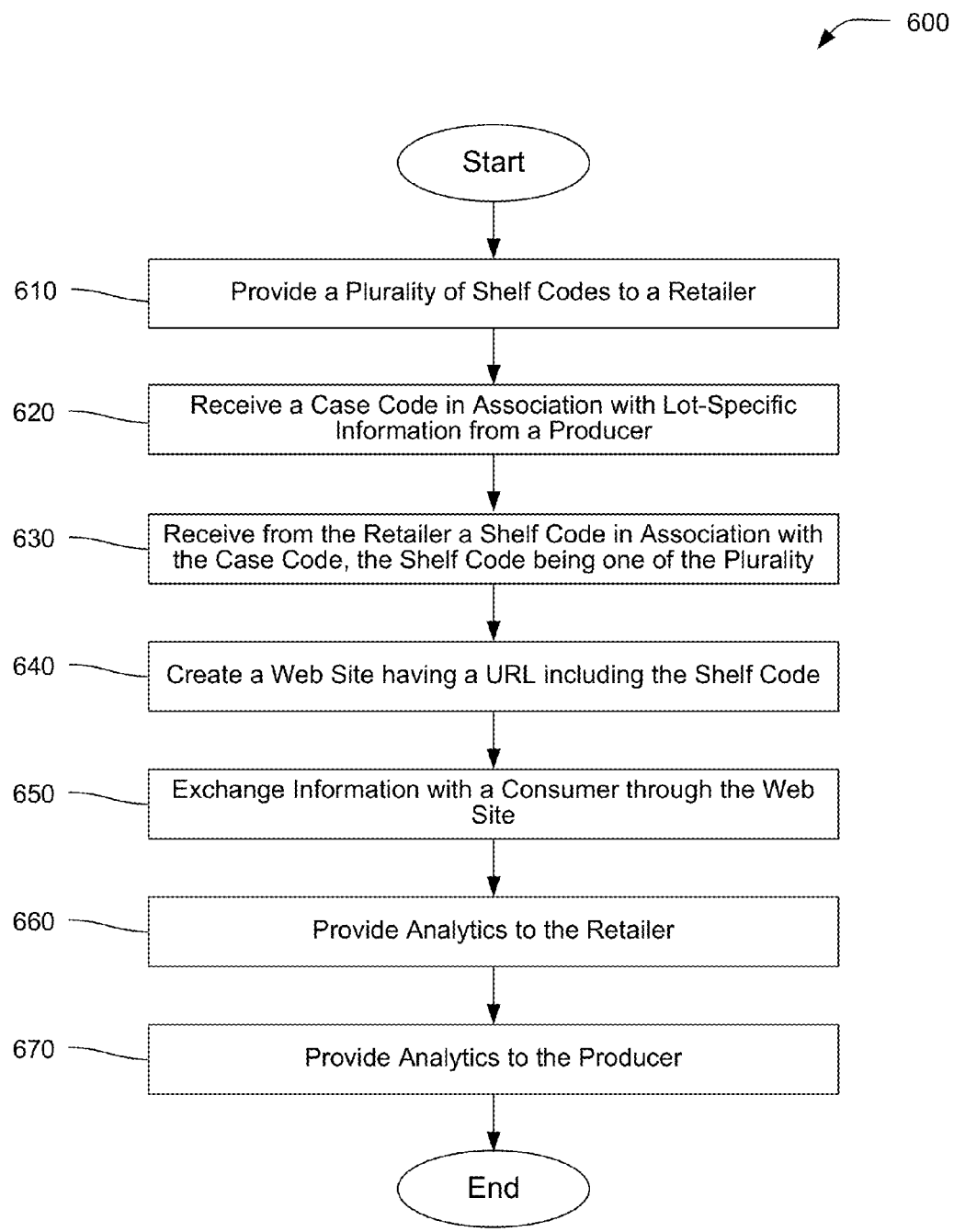
FIG. 6 is a flowchart representation of a method of associating case codes with shelf codes according to an exemplary embodiment of the present invention.

FIG. 6 illustrates another method 600 of the invention directed to steps that can be performed by a third party in communication with both producers and retailers of bulk merchandise. In a step 610 the third party provides a plurality of shelf codes 100 to a retailer. In some embodiments the third party generates the shelf codes 100 and provides the shelf codes 100 electronically so that the retailer can print shelf labels 110 including the shelf codes 100. In other embodiments the third party generates the shelf codes 100 and prints each as a bar code on a label 400 or on a sticker 500 as described above with respect to FIGS. 4 and 5. The printed labels 400 or stickers 500 are then provided to the retailer.

Independently, in a step 620, the third party receives from a producer a case code in association with lot-specific information for bulk merchandise. The third party creates and stores a record of the case code in association with the lot-specific information. The case code and lot-specific information can be uploaded to a computing system and stored in a database such a database 145. Step 620 can optionally also comprise receiving, in association with the case code, lot-independent information such as a GTIN which may also be stored in the record. For the purposes of explaining the method 600 only one case code is considered, but it will be appreciated that in practice a plurality of case codes and associated information are provided over time to the computing system as new lots of bulk merchandise are packaged for distribution.

In a step 630 the third party receives from the retailer a shelf code 100 in association with the case code, where the shelf code 100 is one of the plurality of shelf codes 100 provided in step 610. This indicates to the third party that the shelf code 100 has been placed in service in conjunction with bulk merchandise previously associated by the producer with the case code. Accordingly, the third party stores the shelf code 100 in association with the case code, for example, by adding the shelf code 100 to the record created in step 620. Other shelf codes 100 associated with the same case code and received from the same or other retailers can also be associated with the same record created in step 620. In further embodiments, the third party receives from the retailer additional information associated with the shelf code 100, such as a price and location, which can be added to the record created in step 620 or can be maintained in a separate record for the shelf code 100. As noted previously, receiving information associated with case codes from producers in step 620 and associated with shelf codes 100 from retailers in step 630 can simply comprise receiving pointers to locations where such information is stored in other databases.

Once a shelf code 100 has been placed into service by the retailer, in a step 640 the third party creates a web site linked to a URL that includes the shelf code 100 such as www.example.com/shelf_code. Creating the web site can comprise populating a template with lot-independent and lot-specific information associated with the case code. In some embodiments, an appropriate template for the web site is selected based on the GTIN associated with the case code. In various embodiments the web site can also be populated with other information associated with the shelf code 100 by the retailer. In various embodiments the web site can also be configured to provide retailer-specific content and/or links to web sites maintained by the retailer.

It will be appreciated that step 630 can be repeated multiple times as a bin 105 is repeatedly stocked. With each iteration the step 640 can comprise recreating or updating the web site. If the retailer assigns the bin 105 to different bulk merchandise, for example, and associates the existing shelf code 100 to a new case code, the third party can retain the record already created in step 620, but flag the shelf code 100 as no longer valid. Thus, the same shelf code 100 can be associated with multiple case codes over time, but only the most recently associated case code would be tied to the web site.

In a step 650, the third party exchanges information with a consumer through the web site. Step 650 includes receiving a request for the web site and serving the web site to the consumer, providing the consumer with lot-independent and lot-specific information associated with the case code and optionally associated with the shelf code 100. In various embodiments step 650 additionally comprises receiving information in the form of a quality assessment from the consumer and storing the quality assessment in the record created in step 620. The quality assessment can also be associated with a time stamp that reflects the time that the web site was accessed. Methods for providing quality assessments with a mobile device are described in greater detail in U.S. patent application Ser. No. 12/877,467 filed on Sep. 8, 2010 and entitled "Lot Identification Codes for Packaging" which is incorporated herein by reference.

The exchange of information in step 650 can additionally comprise serving retailer or producer specific content such as in-store specials and promotions, games and contests, and so forth. The exchange of information in step 650 can additionally comprise receiving content from consumers such as comments that can be posted to a comments page for other consumers to view. Such consumer content can also be tied to social media web sites so that a consumer can share an opinion on merchandise with others.

In a step 660 analytic results are provided to the retailer, while in a step 670 analytic results are provided to the producer. Such analytics typically depend on the collection of statistically significant amounts of information over time. Analytic results provided to the retailer can include which products' shelf codes 100 were scanned by consumers most frequently, which incentives generated the greatest responses, which producers' merchandise was most highly rated, and the like. Analytic results provided to the producer can include how long does it take to get merchandise to market and how the merchandise is rated as functions of time and distance from the point of origin of the supply chain.

Figure 7:
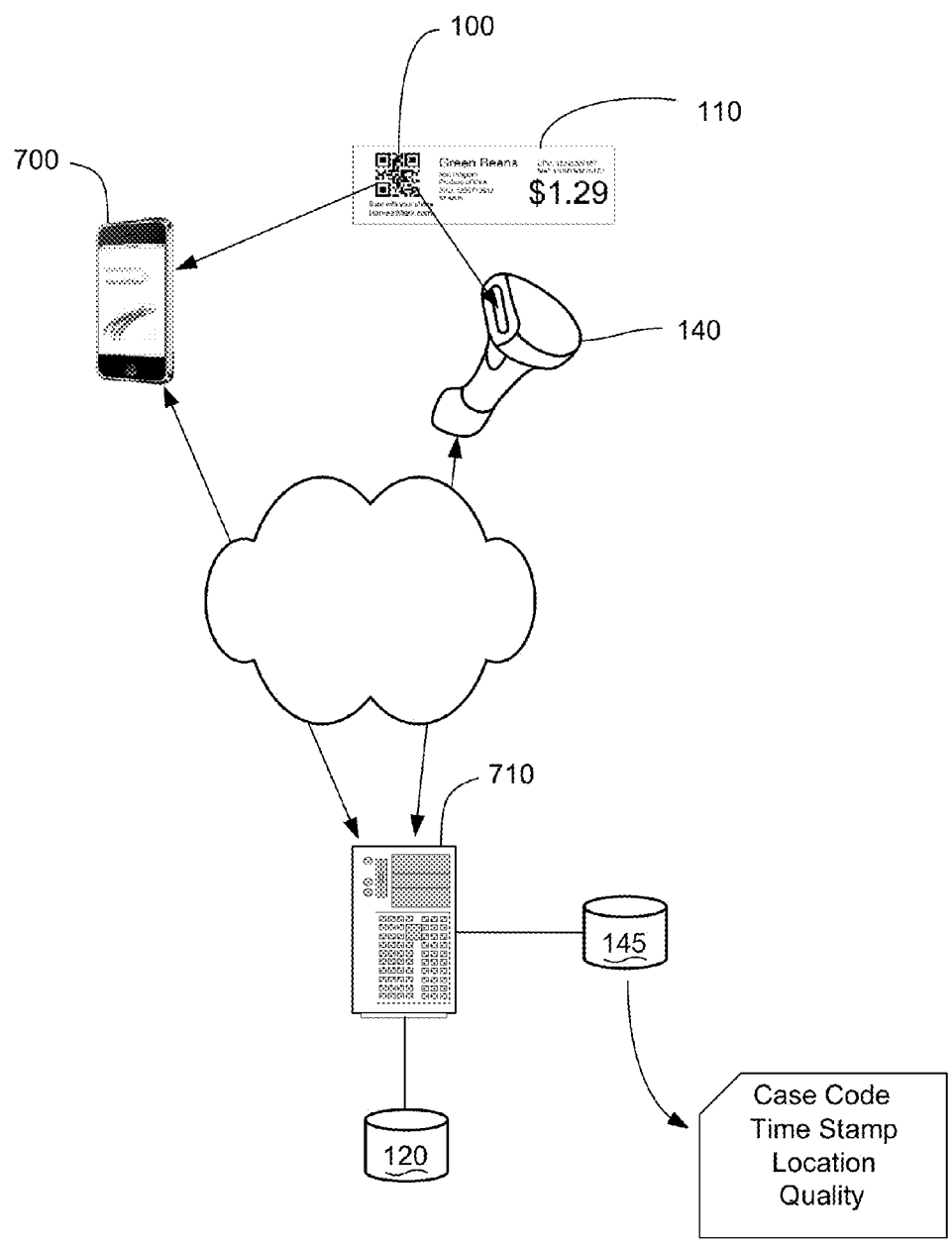
FIG. 7 illustrates two different mobile scanning devices each reading a shelf code and connecting to a computing device according to exemplary embodiments of the present invention.

Returning to step 650 of FIG. 6 and to FIG. 2, once steps 210 through 240 have been completed by the retailer and the third party has created the web site in step 640 (FIG. 6), a consumer can scan the shelf label 110 with another mobile scanning device 700, such as a smart phone, as shown in FIG. 7. A suitable mobile scanning device 700 is one configured, through an application for example, to read a bar code including a URL, connect to the web site specified by the URL, and display information received from the web site, where the web site is represented in FIG. 7 by a computing system 710. Reading the bar code can comprise capturing an image of the bar code and extracting the URL from the image. Connecting to the web site can be accomplished through a Wi-Fi network connection to the Internet or through a cellular wireless network, for instance.

The computing system 710 can be a server, for example. In some embodiments, the computing system 710 is the same as computing system 115, while in other embodiments they are separate systems but communicate with one or more of the same databases 120, 145. The computing system 710 can record each trace event as a record including the case code, a time stamp, and optionally a location. Other demographic or personal information (such as a loyalty card number, gender or age) can also be associated with the trace event, if available. This information is valuable for understanding what products appeal to which consumers, which products generate the most curiosity amongst various demographics, and the like.

FIG. 7 also illustrates that in some embodiments the mobile scanning device 140 can be use to provide quality assessments to the computing system 710 as described with respect to step 270 (FIG. 2). Quality assessments from both consumers and the retailer can be associated with the case code. Also in various embodiments, the mobile scanning device 140 can be configured to associate the shelf code 100 to a bin identifier as in step 220, and/or configured to associate the removal of stock from a bin 105 to shelf code 100, as in step 280.

In another embodiment of the present invention, each case 130 (FIG. 1) carries two paired labels, a case label 135 (FIG. 1) and a removable label that is meant to be affixed on or near a merchandise display such as bin 105 after the case 130 has been received by a retailer. The removable label includes a shelf code that can be read by consumers and others using an optical reader, such as a smartphone camera. In contrast to earlier described embodiments, retailers in these embodiments do not have to associate the case codes to shelf codes when stocking bins because the association is made prior to the receipt by the retailer.

Figure 8:
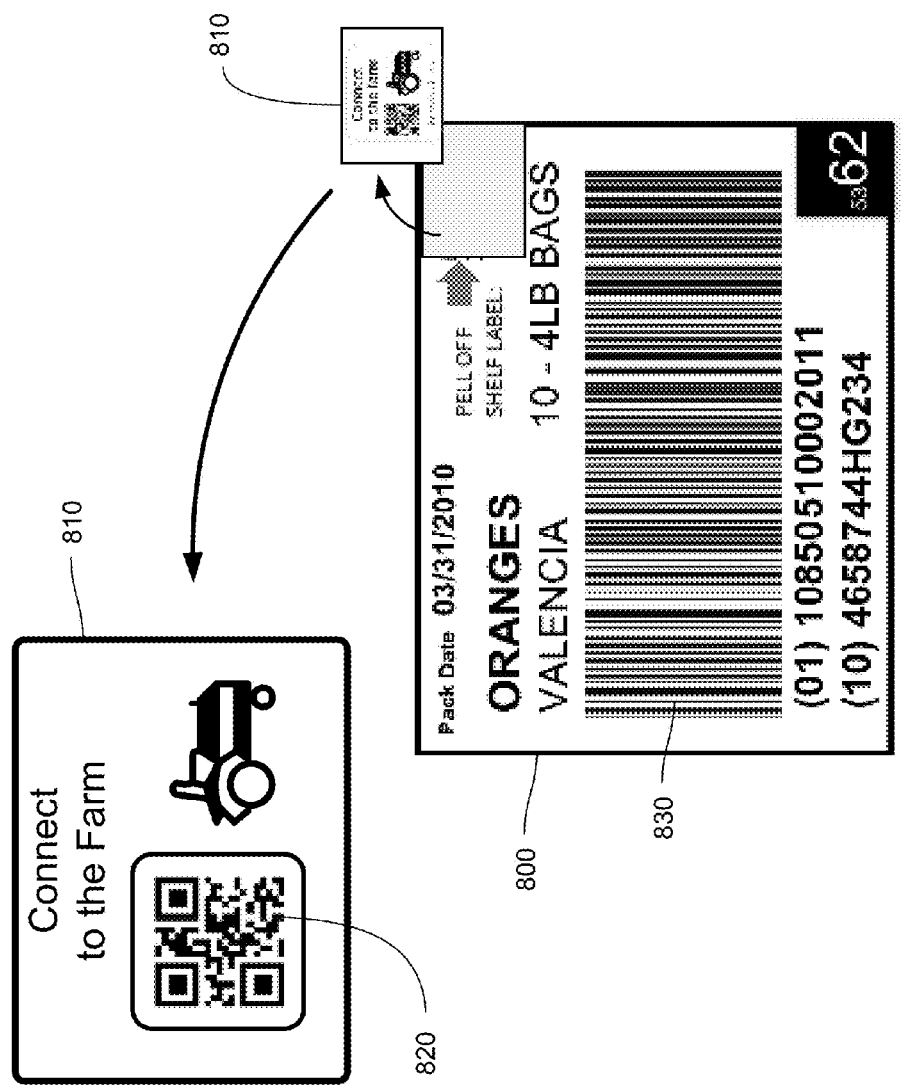
FIG. 8 illustrates a case label including a removable label according to an exemplary embodiment of the present invention.

For example, FIG. 8 illustrates an exemplary case label 800 comprising a removable label 810 that can be removed from the case 130 when merchandise from the case 130 is stocked to a merchandise display such as bin 105. The removable label 810 is then affixed on or near the bin 105, for example to a shelf, shelf-strip, or sign proximate to the display. It will be appreciated that although the illustrated embodiment provides a removable label 810 that is a label designed to peel off of the case label 800, other configurations will also work. For instance, the removable label could extend from the case label 135 as a separable tab that can be removed along a line of perforations. The removable label can also be a separate label from the case label 135, and placed proximate to the case label 135 on the case 130.

With respect to the exemplary case label 800, the removable label 810 comprises a label or sticker with an adhesive backing on one side. On the opposite side is a shelf code 820 provided in a machine-readable format such as a bar code, with a QR code as one example. The case label 800 also includes a case code 830 that is associated with harvest information; the shelf code 820 is also associated with the case code 830. Case codes 830 and shelf codes 820, as used herein, have the same attributes as case codes and shelf codes 100 discussed above. It is noted, however, that the retailer in the exemplary methods described below does not provide the shelf codes 820.

An adhesive of the removable label 810 can be a low-tack adhesive so that the removable label 810 can be easily removed from a shelf or other surface once no longer needed. The adhesive can also be pressure-sensitive. Some embodiments of the case label 800 include either a small undercut or tab to facilitate the removal of the removable label 810 from the case label 800. In some embodiments, the removable label 810 includes a radio frequency tag written with the shelf code 820 in addition to, or in place of, the printed shelf code 820.

Figure 9:
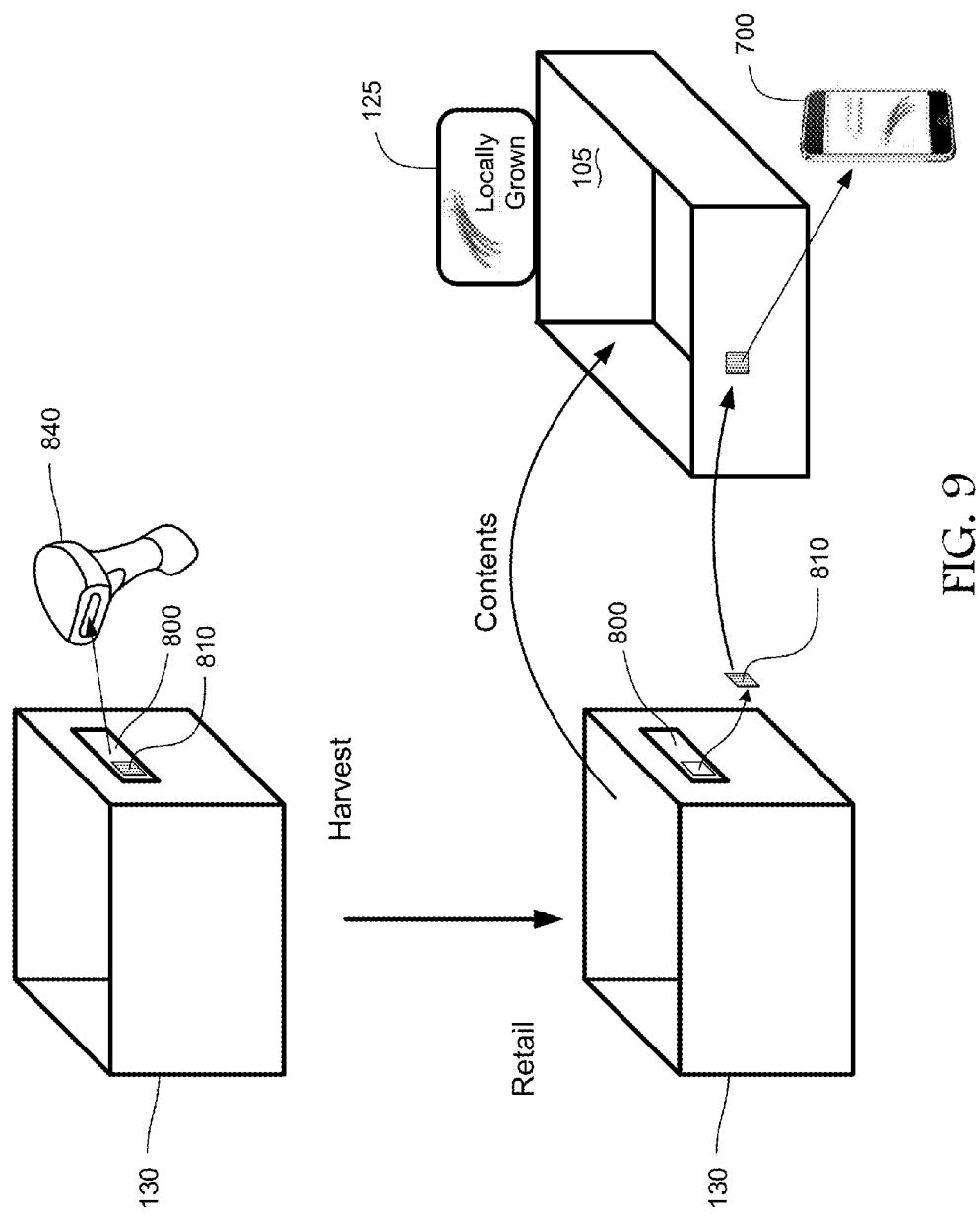
FIG. 9 schematically represents a method according to another exemplary embodiment of the present invention.

FIG. 9 is a schematic representation of an exemplary method of the invention that employs case labels 800. In some embodiments, a batch of case labels 800 are produced (not illustrated) after the decision has been made to harvest, but prior to the start of the harvest, and once enough lot-specific information exists to determine case codes 830. A batch of case labels 800 includes a sufficient number of case labels 800 for the expected number of cases 130 to be filled at the harvest. Creating the batch of case labels 800 can comprise generating case codes 830 and shelf codes 820 as generally described above. In various embodiments, each case label 800 includes a unique case code 830 and a unique shelf code 820, though a common case code 830 can be paired with unique shelf codes 820, and unique case codes 830 can be paired with a common shelf code 820. Once generated, the case codes 830 and shelf codes 820 are stored in association, such as in database 145 (FIG. 1). The case labels 800 are printed onto suitable label stock having a removable portion that receives the shelf code 820.

The case labels 800 are then brought to the harvest event and affixed to cases 130 as the cases 130 are filled. Harvest information is associated with either the case code 830, for example, by reading the case code 830 with a mobile scanning device 840, analogous to mobile scanning device 140 (FIG. 1). The harvest information can be entered through the mobile scanning device 840, in some instances, and stored in the same database record as was created for associating the case code 830 and shelf code 820. In those embodiments in which all case codes 830 in the batch encode the same SKU and lot number, only one such case code 830 needs to be scanned to make the association with the harvest information; scanning the case code 830 and associating the harvest information therewith can be performed, in some embodiments, using mobile scanning device 840. The case code 830 can also be associated to the harvest information through other means, such as by reading and transcribing the case code 830 and the harvest information into a spreadsheet.

After the harvest event the cases 130 enter the stream of commerce where the case code 830 or shelf code 820 can be used to obtain access to the harvest information. Once received by a retailer, the merchandise is unloaded from the case 130 and stocked, such as to a bin 105. The removable label 810 is removed from the case 130 and affixed to the bin 105 or a shelf, shelf-strip, or sign proximate to the bin 105.

The retailer can scan the case code 830 or shelf code 820 to update the store's database 120, to update electronic signage, and so forth.

Consumers with mobile devices 700 can scan shelf codes 820 as described above. In those embodiments where each shelf code 820 is unique, when a shelf code 820 is scanned, the computing system 710 (FIG. 7) can then determine the location of that particular label 800 (e.g., through the GPS of the consumer's mobile device 700)—and uniquely discriminate it from shelf codes 820 of labels 800 that went to other stores, even if they are associated with the same harvest information.

Logic described herein can comprise, for example, hardware, such as application-specific integrated circuits (ASICs), specifically designed to perform the particular described functions. Logic can also comprise firmware residing, for instance, in read only memory (ROM) or flash memory, where the firmware is programmed to perform the particular described functions. Logic can also comprise a microprocessor capable of executing software residing in a memory, for example, in random access memory (RAM), where the computer instructions embodied in the software, when executed by the microprocessor perform the particular described functions. Any combination of two or more of hardware, firmware, and software can also comprise logic. Hardware, firmware, and/or software can be embodied in hand-held devices such as smart phones running third-party applications, for example. Logic comprising hardware, firmware, and/or software can also be embodied in various types of computing systems such as servers and personal computers. It will be appreciated that such computing systems, when configured to follow specific logic embodied in their circuits or programming instructions, or both, constitute specific machines.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
   creating a batch of paired labels, each pair of labels including
   a case label including a case code, and
   a shelf label including a machine-readable URL including a domain and an extension, the extension specifying a shelf code;
   storing an association between the shelf code and the case code for each pair of the batch;
   associating lot-specific information to a case code from the batch; and
   creating a web site identified by the URL from at least one of the shelf labels.

2. The method of claim 1 wherein the machine-readable URL is encoded by a QR code.

3. The method of claim 1 wherein the shelf label is disposed on the case label, and is removable therefrom.

4. The method of claim 1 wherein the case code of each pair of the batch is unique.

5. The method of claim 1 wherein the shelf code of each pair of the batch is unique.

6. The method of claim 1 further comprising receiving a quality rating and associating the rating to the shelf code.

7. A case label comprising:
   a primary label including a removable label, the removable label being removable from the primary label after the primary label has been adhered to a surface, the primary label including a case code and information about bulk merchandise;
   the removable label including a call to action and a bar code comprising a URL, the URL including a domain and an extension, the extension specifying a shelf code.

8. The case label of claim 7 wherein the removable label peels off of the primary label.

9. The case label of claim 7 wherein the removable label comprises a separable tab removable along a line of perforations.

10. The case label of claim 7 wherein the bar code is a QR code.

11. The case label of claim 7 wherein the removable label includes a low-tack and pressure-sensitive adhesive on a side opposite the bar code.

* * * * *